ус009969234B2

United States Patent
Osborne et al.

(10) Patent No.: US 9,969,234 B2
(45) Date of Patent: May 15, 2018

(54) TRAILER WITH HEIGHT-ADJUSTING AXLE ASSEMBLY

(71) Applicant: RAIZER ENTERPRISES, LLC, Jackson, MI (US)

(72) Inventors: Kelly Osborne, Jackson, MI (US); Thomas L. Sundberg, Northville, MI (US)

(73) Assignee: Raizer Enterprises, LLC, Jackson, MI (US)

( * ) Notice: Subject to any disclaimer, the term of this patent is extended or adjusted under 35 U.S.C. 154(b) by 0 days. days.

(21) Appl. No.: 15/135,640

(22) Filed: Apr. 22, 2016

(65) Prior Publication Data
US 2016/0311284 A1    Oct. 27, 2016

Related U.S. Application Data

(60) Provisional application No. 62/151,137, filed on Apr. 22, 2015.

(51) Int. Cl.
*B60G 17/005*    (2006.01)
*B60G 5/00*    (2006.01)

(52) U.S. Cl.
CPC ............. *B60G 17/005* (2013.01); *B60G 5/00* (2013.01); *B60G 2204/46* (2013.01); *B60G 2204/4604* (2013.01); *B60G 2300/04* (2013.01); *B60G 2500/30* (2013.01)

(58) Field of Classification Search
CPC .................... B60G 17/005; B60G 5/00; B60G 2204/4604; B60G 2204/46; B60G 2500/30; B60G 2300/04
See application file for complete search history.

(56) References Cited

U.S. PATENT DOCUMENTS

| 2,540,279 | A | 2/1951 | Mosier |
| 2,631,863 | A | 3/1953 | Tranter et al. |
| 2,779,602 | A | 1/1957 | Kimbro et al. |
| 2,806,710 | A | 9/1957 | Mascaro |
| 2,876,922 | A | 3/1959 | Holiday |
| 2,882,064 | A | 4/1959 | Morrison |

(Continued)

FOREIGN PATENT DOCUMENTS

| FR | 2 721 580 A1 | 12/1995 |
| FR | 2 773 533 A1 | 7/1999 |

*Primary Examiner* — Paul N Dickson
*Assistant Examiner* — Timothy Wilhelm
(74) *Attorney, Agent, or Firm* — Young Basile Hanlon & MacFarlane, P.C.

(57) ABSTRACT

A height adjusting mechanism for a trailer includes first and second cross-beams, an interconnecting bar pivotally connected to the first and second cross-beams, an actuator that is connected to one of the first cross-beam or the second cross-beam to cause rotation of the first cross-beam and the second cross-beam between a first rotational position and a second rotational position. A locking mechanism is operable move between an unlocked position and a locked position to prevent pivoting of the first and second cross-beams with respect to the interconnecting bar. First and second pairs of wheels are connected to the first and second cross-beams by first and second pairs of torsion axles such that rotation of the first and second cross-beams causes rotation of the first and second pairs of torsion axles.

9 Claims, 6 Drawing Sheets

(56) References Cited

U.S. PATENT DOCUMENTS

| | | | | |
|---|---|---|---|---|
| 2,934,228 A | * | 4/1960 | Hillberg | B60P 1/025 414/458 |
| 3,180,510 A | | 4/1965 | Moller | |
| 3,635,492 A | | 1/1972 | Mauldin | |
| 3,689,950 A | | 9/1972 | Jalowiecki | |
| 3,768,677 A | | 10/1973 | Moss | |
| 1,008,902 A | | 2/1977 | Dill | |
| 4,006,833 A | | 2/1977 | Neukom et al. | |
| 4,008,902 A | * | 2/1977 | Dill | B60P 1/025 280/43.23 |
| 4,125,198 A | | 11/1978 | Landoll | |
| 4,593,840 A | | 6/1986 | Chown | |
| 4,900,055 A | * | 2/1990 | Wright | B60G 5/00 280/124.169 |
| 5,161,814 A | * | 11/1992 | Walker | B60G 11/225 280/414.1 |
| 5,195,764 A | * | 3/1993 | Schantz | B60G 5/04 280/43.22 |
| 5,474,320 A | | 12/1995 | Bojarski | |
| 5,476,274 A | | 12/1995 | Oberlander | |
| 5,823,558 A | | 10/1998 | Shoquist | |
| 5,863,049 A | | 1/1999 | Mahvi | |
| 5,887,880 A | * | 3/1999 | Mullican | B60G 3/14 280/124.116 |
| 6,152,486 A | * | 11/2000 | Pierce | B60G 17/005 280/755 |
| 6,450,522 B1 | | 9/2002 | Yamada et al. | |
| 6,588,778 B1 | | 7/2003 | McLaughlin | |
| 6,592,139 B1 | | 7/2003 | Shanahan | |
| 6,616,167 B2 | | 9/2003 | Guiet | |
| 7,401,804 B1 | * | 7/2008 | Rupp | B60P 1/027 280/43.1 |
| 7,534,083 B2 | * | 5/2009 | Trudeau | B60P 1/02 414/482 |
| 7,618,227 B2 | * | 11/2009 | Smith | B60P 1/027 280/414.5 |
| 8,267,410 B1 | * | 9/2012 | Stutz | B60G 5/00 280/43.23 |
| 8,360,448 B2 | | 1/2013 | Lariviere | |
| 8,820,767 B1 | * | 9/2014 | Osborne | B60G 11/225 280/124.166 |
| 9,428,027 B2 | * | 8/2016 | Iliuta | B60P 1/027 |
| 2005/0184485 A1 | | 8/2005 | Timmermans | |

\* cited by examiner

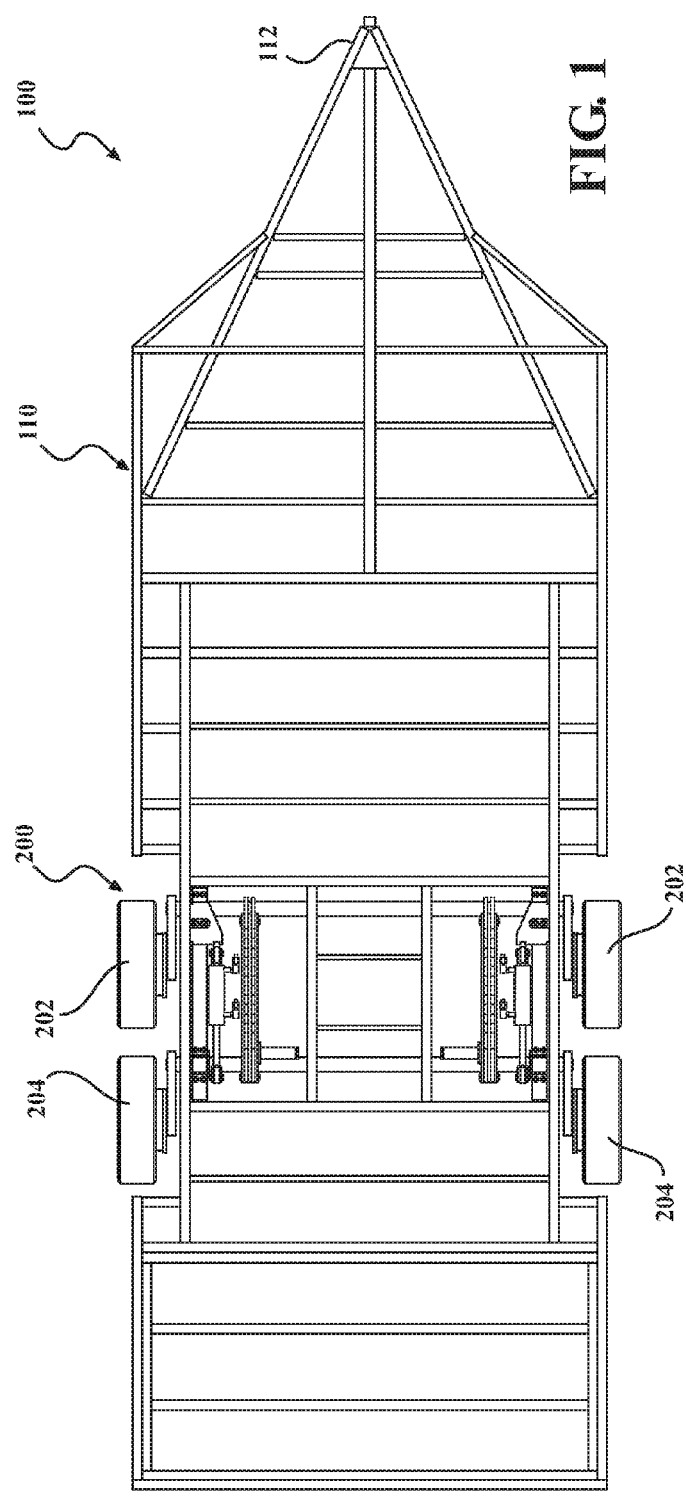
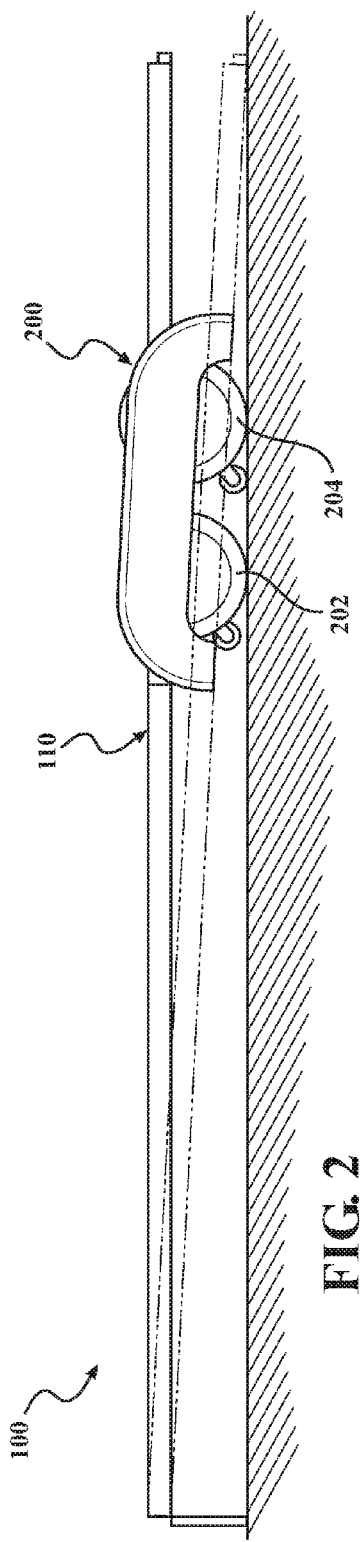

TRAILER WITH HEIGHT-ADJUSTING AXLE ASSEMBLY

CROSS-REFERENCE TO RELATED APPLICATIONS

This application claims the benefit of U.S. patent application No. 62/151,137, which was filed on Apr. 22, 2015.

BACKGROUND

Load-carrying trailers designed to be towed behind vehicles are well known. While trailers were used extensively long before motor vehicles were popularized in the twentieth century, use of trailers has increased dramatically in the past hundred years. Naturally, this dramatic increase in trailer use has resulted in development of a large array of trailer designs of varying configurations, many of which are specially adapted to perform a specific function or to be utilized in conjunction with a specific activity.

A very common trailer design incorporates a substantially flat bed or deck on which a load to be carried is placed. Such trailers are typically equipped with a frame, one or more axles affixed to said frame, a tongue or other device for connecting the trailer to a towing vehicle, and a bed or deck on which a load may be positioned and secured.

To ensure that the load-carrying portions of the trailer do not contact the surface on which the trailer is being operated, the wheels and axles of the trailer are generally designed to position the frame and the load-carrying deck some distance above the surface on which the trailer is operated. The result is that the load-carrying surface of the trailer is elevated in relation to the ground. Thus, when the trailer is to be loaded or unloaded, the intended load must be lifted from ground level to the level on which the trailer deck or bed is disposed or vice versa. For lightweight objects, this is not a significant problem, since those objects can simply be manually moved from ground level to trailer deck level. For heavier objects, however, such as vehicles, including motorcycles, manual lifting of the intended load is not practical.

In response to this problem, a number of methods have been developed for facilitating the loading of cargo onto the deck or bed of a trailer. In one scheme, the trailer bed and/or frame are pivotally mounted in relation to the trailer axle, allowing the rearmost edge of the trailer deck to be rotated down into contact with the ground. This allows the cargo to be rolled or slid from the ground surface to the deck of the trailer. Once the load has been so transferred, the bed and/or frame can be pivoted to a more or less horizontal position. While this system is simple, it relies upon pivoting the deck of the trailer with respect to the axle of the trailer. Because the distance between the axle of the trailer and the rearmost edge of the trailer is typically quite short, the deck of the trailer is disposed at a steep incline when the rearmost edge of the trailer is in contract with the ground. Thus, due to the angle of the trailer deck it is often awkward or difficult to transfer the load up the incline created by pivoting the trailer deck with respect to the axle of the trailer.

Another technique which is commonly used is the addition of removable or extensible ramp elements which may be affixed to the back edge of the trailer deck. Such ramps or extensions may be completely removable or may be hinged to the rear edge of the trailer and pivoted into the loading and transport positions as needed. While this methodology is simple, it is subject to the same limitations of the tilting frame/bed trailer arrangement above-described in that the ramp elements often present an incline over which it may be difficult to maneuver cargo to be loaded onto the trailer.

One known trailer with a height-adjusting mechanism for changing the height of a load supporting portion of a trailer includes a single axle that is rotatable connected to a trailer frame of the trailer for rotation between a towing position and a loading position. The axle has a first portion and a pair of axle shafts that are resiliently mounted with respect to the first portion for rotation over a limited angular range of motion and are biased toward a neutral position. A pair of opposed pivot arms are rotatable in response to rotation of the axle between the towing position and the loading position. The pivot arms are rotatable with the axle shaft of the axle in response to rotation of the axle shaft with respect to the central portion of the axle.

SUMMARY

One aspect of the disclosed embodiments is a height adjusting mechanism for a trailer. The height adjusting mechanism includes a first cross-beam, a second cross-beam, an interconnecting bar that is pivotally connected to the first cross-beam and the second cross-beam, and an actuator to cause rotation of the first cross-beam and the second cross-beam between a first rotational position and a second rotational position. The height adjusting mechanism also includes a locking mechanism that is operable to move between an unlocked position and a locked position, wherein the locking mechanism prevents pivoting of the first cross-beam and the second cross-beam with respect to the interconnecting bar in the locked position. A first pair of wheels are each connected to the first cross-beam by a first pair of torsion axles such that rotation of the first cross-beam causes rotation of the first pair of torsion axles. A second pair of wheels that are connected to the second cross-beam by a second pair of torsion axles such that rotation of the second cross-beam causes rotation of the second pair of torsion axles.

Another aspect of the disclosed embodiments is a height adjustment mechanism for a trailer. The height adjusting mechanism includes a first frame portion and a second frame portion. A first cross-beam extends between the first frame portion and the second frame portion and is supported for rotation with respect to the first frame portion and the second frame portion wherein the first cross-beam extends in a transverse direction. A second cross-beam extends between the first frame portion and the second frame portion and is supported for rotation with respect to the first frame portion and the second frame portion wherein the second cross-beam extends in the transverse direction. An interconnecting bar is pivotally connected to the first cross-beam and the second cross-beam, wherein the interconnecting bar extends in a longitudinal direction. An actuator is connected to the first frame portion and is connected to one of the first cross-beam or the second cross-beam to cause rotation of the first cross-beam and the second cross-beam between a first rotational position and a second rotational position. A locking mechanism is operable to move between an unlocked position and a locked position, wherein the locking mechanism prevents pivoting of the first cross-beam and the second cross-beam with respect to the interconnecting bar in the locked position. A first pair of wheels that are each connected to the first cross-beam by a first pair of torsion axles such that rotation of the first cross-beam causes rotation of the first pair of torsion axles. A second pair of wheels that are each connected to the second cross-beam by a second pair of torsion axles such that rotation of the second cross-beam causes rotation of the second pair of torsion axles.

Another aspect of the disclosed embodiments is a trailer that includes a trailer frame and a height adjusting mechanism that is connected to the trailer frame. The height adjustment mechanism has a first frame portion, and a second frame portion. A first cross-beam extends between the first frame portion and the second frame portion and is supported for rotation with respect to the first frame portion and the second frame portion wherein the first cross-beam extends in a transverse direction. A second cross-beam extends between the first frame portion and the second frame portion and is supported for rotation with respect to the first frame portion and the second frame portion wherein the second cross-beam extends in the transverse direction. An interconnecting bar is pivotally connected to the first cross-beam and the second cross-beam, wherein the interconnecting bar extends in a longitudinal direction. An actuator is connected to the first frame portion and is connected to one of the first cross-beam or the second cross-beam to cause rotation of the first cross-beam and the second cross-beam between a first rotational position and a second rotational position. A locking mechanism is operable to move between an unlocked position and a locked position, wherein the locking mechanism prevents pivoting of the first cross-beam and the second cross-beam with respect to the interconnecting bar in the locked position. A first pair of wheels are each connected to the first cross-beam by a first pair of torsion axles such that rotation of the first cross-beam causes rotation of the first pair of torsion axles. A second pair of wheels are each connected to the second cross-beam by a second pair of torsion axles such that rotation of the second cross-beam causes rotation of the second pair of torsion axles.

BRIEF DESCRIPTION OF THE DRAWINGS

The description herein makes reference to the accompanying drawings, wherein like referenced numerals refer to like parts throughout several views, and wherein:

FIG. 1 is a top view of a trailer with a height-adjusting axle assembly;

FIG. 2 is a side view of the trailer of FIG. 1 in a raised position with a lowered position shown in broken lines;

DETAILED DESCRIPTION

Figure 3:
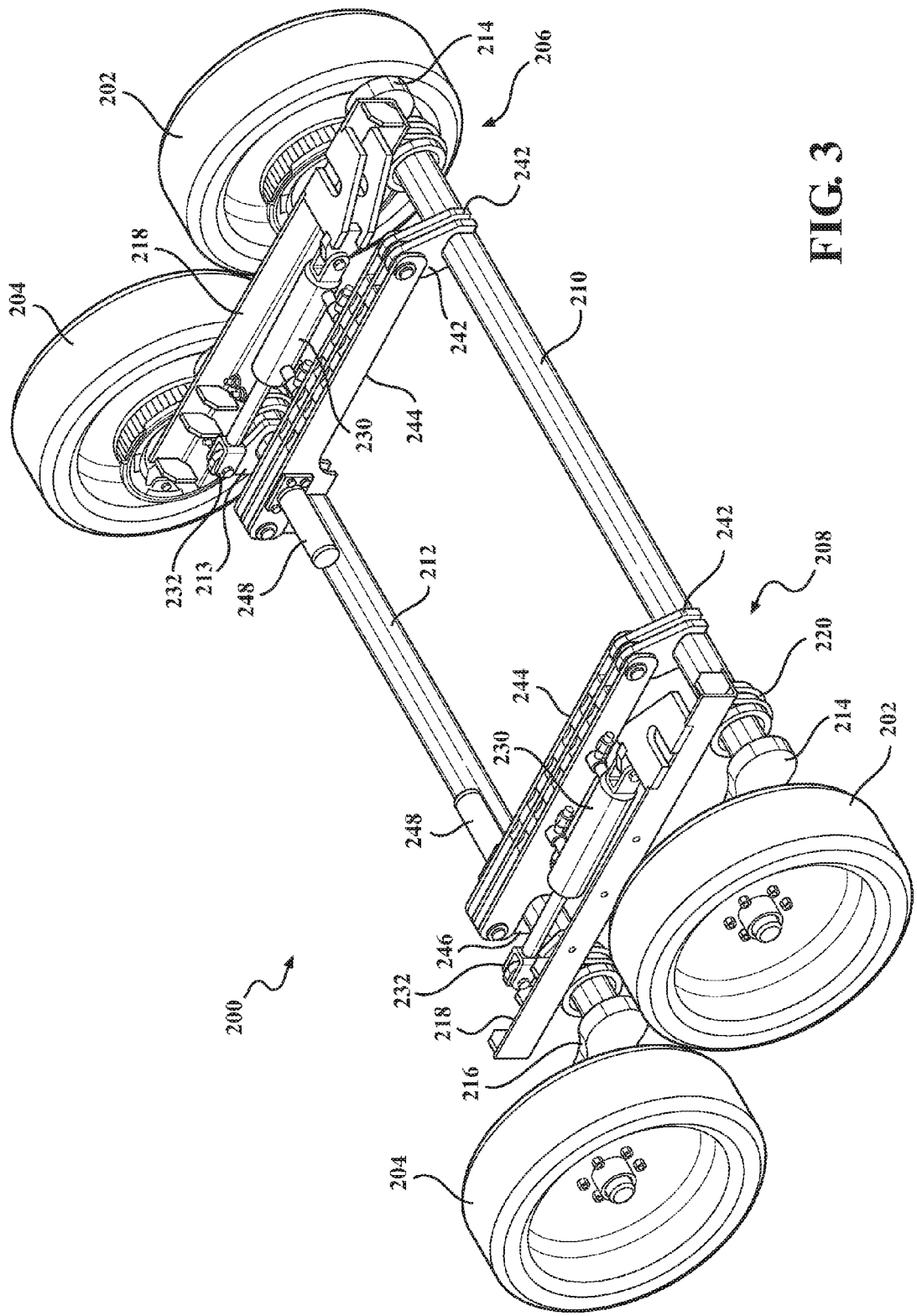
FIG. 3 is a perspective view showing the height-adjusting axle assembly.

The disclosure herein is directed to a dual axle trailer with a height adjusting mechanism. In order to lock the position of the trailer while traveling, a locking mechanism locks a first axle of the trailer to a second axle of the trailer. This prevents unintended trailer bed height adjustment without locking either of the first axle or the second axle to a frame of the trailer.

FIG. 1 is an illustration of a trailer 100. The trailer 100 has a trailer frame 110 and a height adjusting axle assembly 200. As with conventional trailers, the trailer 100 is configured to be towed behind a truck using a hitch connected at a front end 112 of the trailer frame 110.

The trailer 100 has a dual-axle configuration. Accordingly, the height adjusting axle assembly 200 has front wheels 202 and rear wheels 204.

As shown in FIG. 2 the trailer 100 is movable between a raised position (shown in solid lines; also referred to as a travel position or a towing position) and a lowered position (shown in broken lines; also referred to as a loading position).

Figure 4:
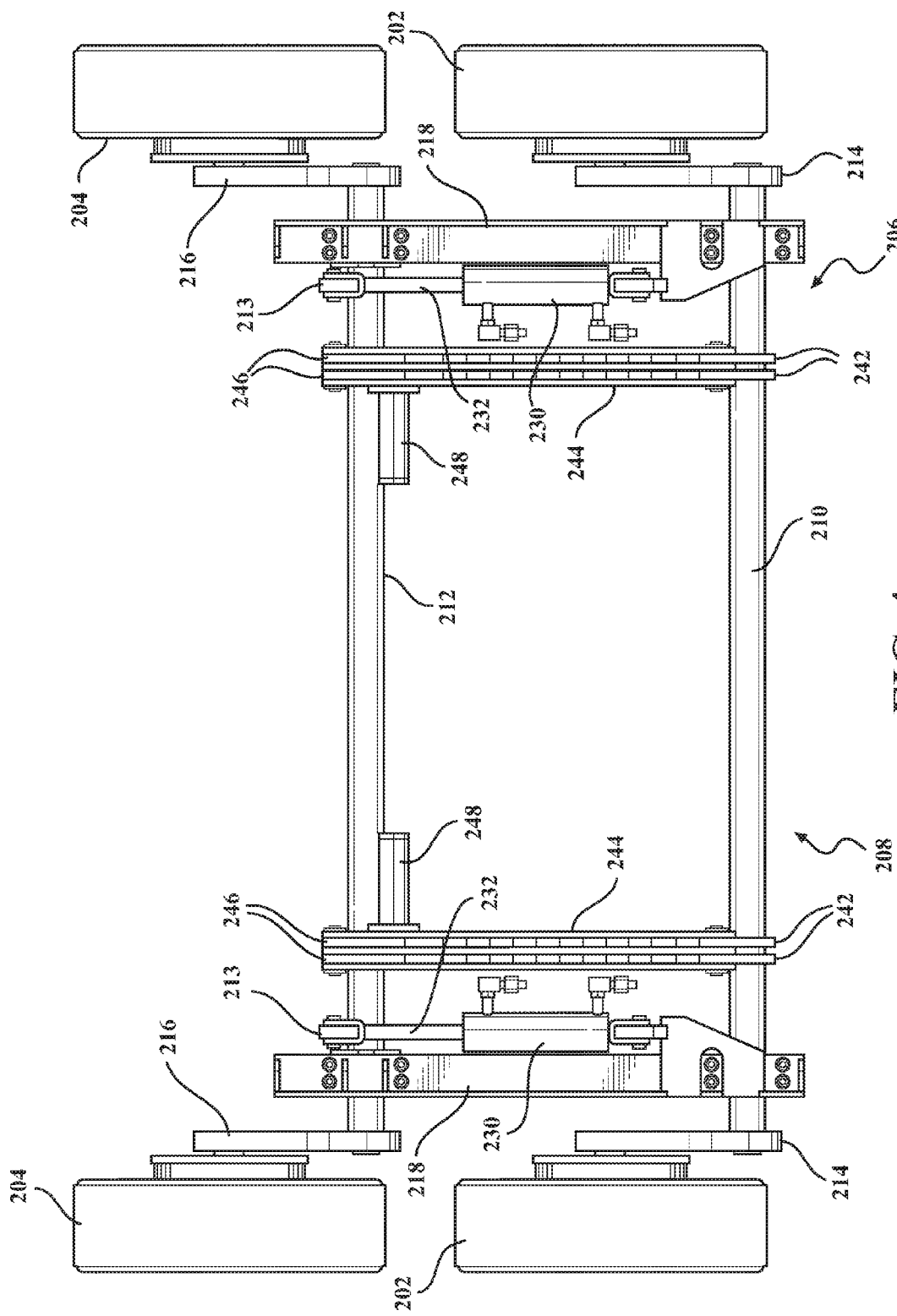
FIG. 4 is a top view showing the height-adjusting axle assembly.
Figure 5:
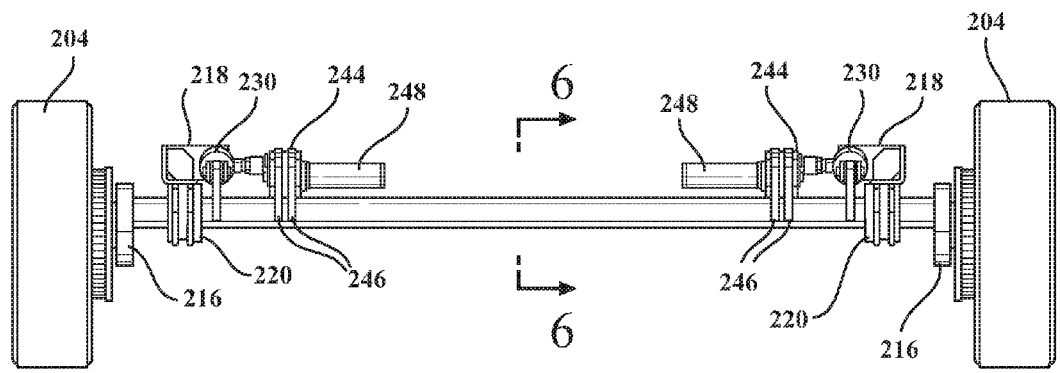
FIG. 5 is a rear view showing the height-adjusting axle assembly in the raised position.
Figure 6:
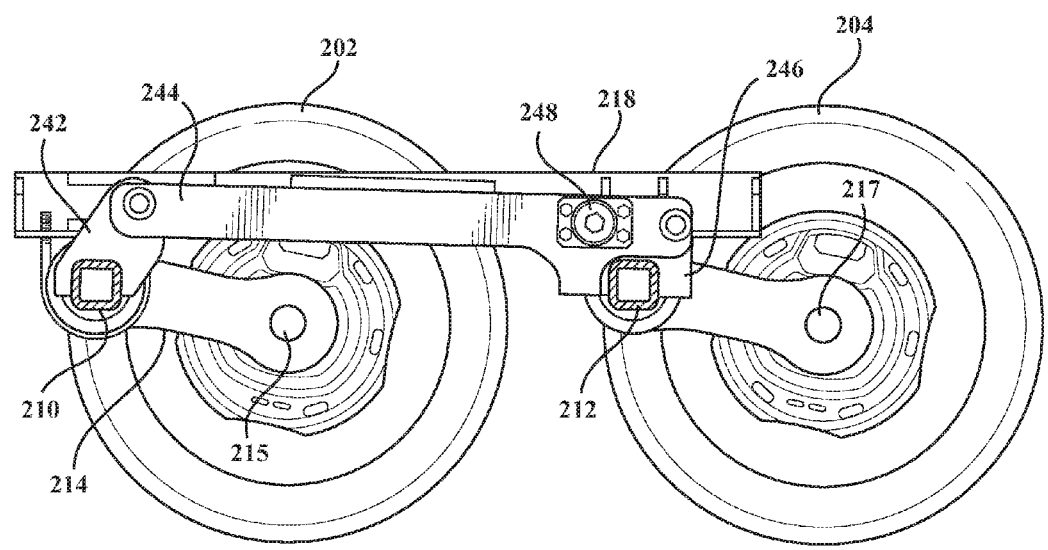
FIG. 6 is a cross-section view taken along line C-C of FIG. 5 showing the height-adjusting axle assembly in the raised position.

FIGS. 3-4 show the height-adjusting axle assembly 200. The axle assembly 200 includes a left-side sub-assembly 206 and a right side sub-assembly 208 that are connected by a front cross-beam 210 and a rear cross-beam 212. The front cross-beam 210 and the rear cross-beam 212 each extend in a transverse direction, which is a side-to-side direction relative to the trailer 100. The front cross-beam 210 and the rear cross-beam 212 may each fully extend between the left-side sub-assembly 206 and the right side sub-assembly 208. The left-side sub-assembly 206 and right-side sub-assembly 208 of the height-adjusting axle assembly 200 can be identical, and they will be described together using common reference numerals.

The front wheels 202 are connected to the front cross-beam 210 by torsion axles 214. The torsion axles 214 include a torsional suspension component (located in cross-beam 210, not shown) that assumes a neutral position absent an external force but allows resilient rotation of the torsional axles 214 away from the neutral position. The torsion axles 214 extend perpendicular to the center line of the cross-beam 210 to offset an axis of rotation of the front wheels 202 from the center line of the cross-beam 210. The rear wheels 204 are connected to the rear cross-beam 212 by torsion axles 216 which are similar to the torsion axles 214.

The front cross-beam extends 210 along a first beam axis, and the rear cross-beam 212 extends along a second beam axis. The front wheels 202 are supported by the first pair of torsion axles 214 such that the front wheels 202 are offset from the first beam axis, and the rear wheels 204 are supported by the torsion axles 216 such that the rear wheels 204 are offset from the second beam axis. Because of this, rotation of the front cross-beam 210 causes rotation of the torsion axles 214 and rotation of the rear cross-beam causes rotation of the torsion axles 216.

The left and right side sub-assemblies each have a support structure. In the illustrated example the support structure is a frame member such as a frame rail 218. The frame rails 218 are connected to the frame 110 of the trailer 100. Furthermore, the frame rails 218 can be the only part of the axle assembly 200 that is connected to the frame 110, making the axle assembly 200 modular.

The front cross-beam 210 and the rear cross-beam 212 are supported by and extend between the frame rails 218. In particular, collars 220 are fixed to the frame rails 218, and the cross-beams 210, 212 extend through and are supported by the collars 220. In the illustrated implementation, bushings are seated in the collars 220. The bushings have a circular exterior shape that matches the inside of the collars 220, and a square through bore that matches the external shape of the cross-beams 210, 212. Thus, the bushings allow each of the cross bars 210, 212 to rotate with respect to the frame rails 218 and consequently the trailer frame 110, as will be explained. Other shapes can be used for the cross-beams 210, 212. The cross-beams could be mounted to the frame rails 218 other than by bushings.

The axle assembly 200 includes an actuator connected to each frame member 218 that is operable to cause rotation of the cross-beams 210, 212 which moves the trailer 100 between the raised and lowered positions. In the illustrated example, the actuator is a linear actuator and in particular a hydraulic cylinder 230 and piston 232, with the cylinder 230 being connected to the frame rail 218 by a pivot joint such as a pin connection. The piston 232 is connected to the rear cross-beam 212 by a pin connection on a flange 213 that is formed on the rear cross-beam 212, extends outward from it, and is fixed to the cross-beam 212 such that the flange 213 and the cross-beam 212 rotate together. Since the flange 213 spaces the pin connection of the piston 232 from the center line of the rear cross-beam 212, extension and retraction of the piston 232 with respect to the cylinder 230 causes rotation of the rear cross-beam 212. In particular, extension of the piston 232 causes movement toward the lowered position and retraction of the piston 232 causes movement toward the raised position.

The front cross-beam 210 and the rear cross-beam 212 are interconnected on each of the left side and the right side by an interconnecting assembly 240. The interconnecting assembly includes a structure that is fixed to the front cross-beam 210 such as a first pair of flanges 242, a structure that is connected to the first pair of flanges 242 such as an interconnecting bar 244, and a structure that is fixed to the rear cross-beam 212 and connected to the interconnecting bar 244 such as a second pair of flanges 246, and a selectively engageable locking mechanism such as a lock pin actuator 248. It should be understood that the first pair of flanges 242 and the second pair of flanges 246 could be replaced with other structures, such as a single flange.

The interconnecting bar 244 extends in a longitudinal direction, which is a front-to-rear direction relative to the trailer 100, with one end of the interconnecting bar 244 positioned adjacent to the front cross-beam 210 and the other end of the interconnecting bar 244 positioned adjacent to the rear cross-beam 212. The first pair of flanges 242 are each pivotally connected to the interconnecting bar 244 to allow pivoting of the first pair of flanges 242 with respect to the interconnecting bar 244. The pivotal connection of the first pair of flanges 242 to the interconnecting bar 244 may be, for example, a pin connection defined by a pin that extends through corresponding apertures defined through the first pair of flanges 242 and the interconnecting bar 244. The second pair of flanges 246 are also each pivotally connected to the interconnecting bar 244 to allow pivoting of the second pair of flanges 246 with respect to the interconnecting bar 244. The pivotal connection of the second pair of flanges 246 to the interconnecting bar 244 may be, for example, a pin connection defined by a pin that extends through corresponding apertures defined through the second pair of flanges 246 and the interconnecting bar 244. Thus, the interconnecting bar 244 is pivotally connected to the front cross-beam 210 by the first pair of flanges 242 and the interconnecting bar 244 is pivotally connected to the rear cross-beam 212 by the second pair of flanges 246.

The pivotal connection of the interconnecting bar 244 to the first pair of flanges 242 and the second pair of flanges 246 permits rotation of the front cross-beam 210 and the rear cross-beam 212. The pivotal connection of the interconnecting bar 244 to the first pair of flanges 242 and the second pair of flanges 246 also causes co-rotation of the front cross-beam 210 and the rear cross-beam 212, by causing corresponding translations of the pivotal connections between the interconnecting bar 244 and the first and second pairs of flanges 242, 246. Thus, when the rear cross-beam 212 is rotated in response to extension or retraction of the cylinder 232, the interconnecting bar 244 causes corresponding rotation of the front cross-beam 210.

The lock pin actuator 248 is an example of a locking mechanism that is movable between an unlocked position and a locked position, and is able to prevent rotation of the front cross-beam 210 and the rear cross-beam 212 when in the locked position. Other functionally equivalent types of actuators and devices may be employed as the locking mechanism.

The lock pin actuator 248 is operable to lock the second pair of flanges 246 to the interconnecting bar 244 to restrain relative rotation. The lock pin actuator 248 is moved to a locked position when the trailer 100 is in the raised position to prevent movement to the lowered position and to allow forces to be transferred between the front cross-beam 210 and the rear cross-beam 212. In the locked position, the locking mechanism, such as the lock pin actuator 248, prevents pivoting of the first cross-beam 210 and the second cross-beam 212. Notably, locking is accomplished by interconnecting the front and rear cross-beams 210, 212 with respect to each other, instead of locking with respect to the frame rails 218 or the trailer frame 110. This can also reduce transfer of forces through the cylinder 230 and piston 232, because the cylinder 230 and the piston 232 will not be tasked with restraining rotation of the front cross-beam 210 and the rear cross-beam 212.

The lock pin actuator 248 is moved to the unlocked position to allow movement of the trailer 100 from the raised position to the lowered position.

Figure 9:
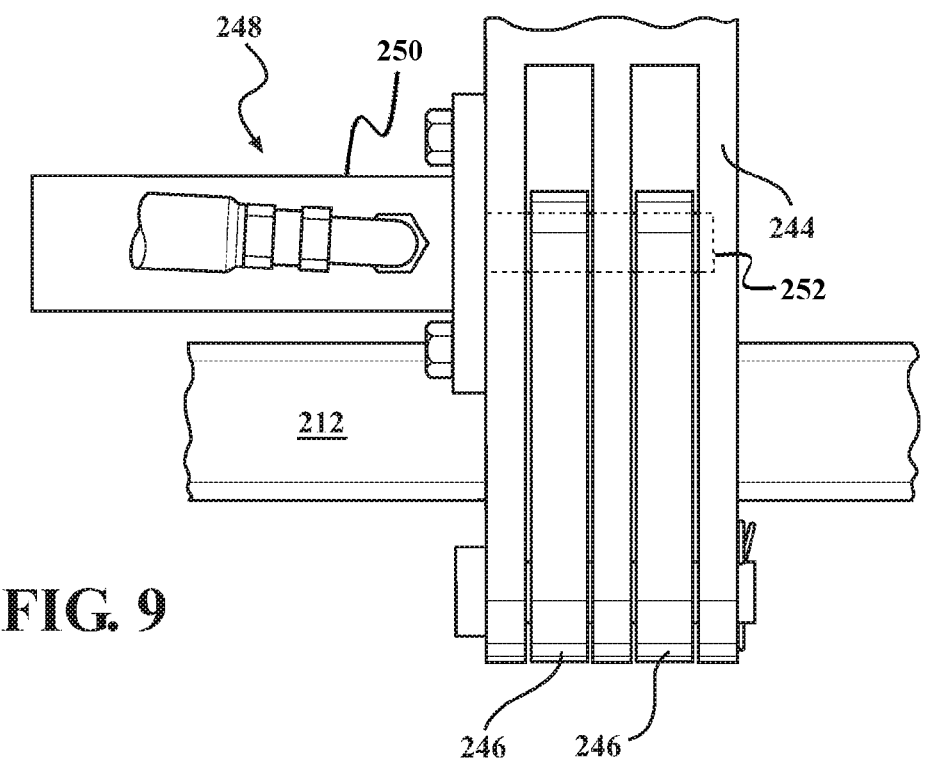
FIG. 9 is a detail view showing a locking mechanism of the height-adjusting axle assembly in a locked position.
Figure 10:
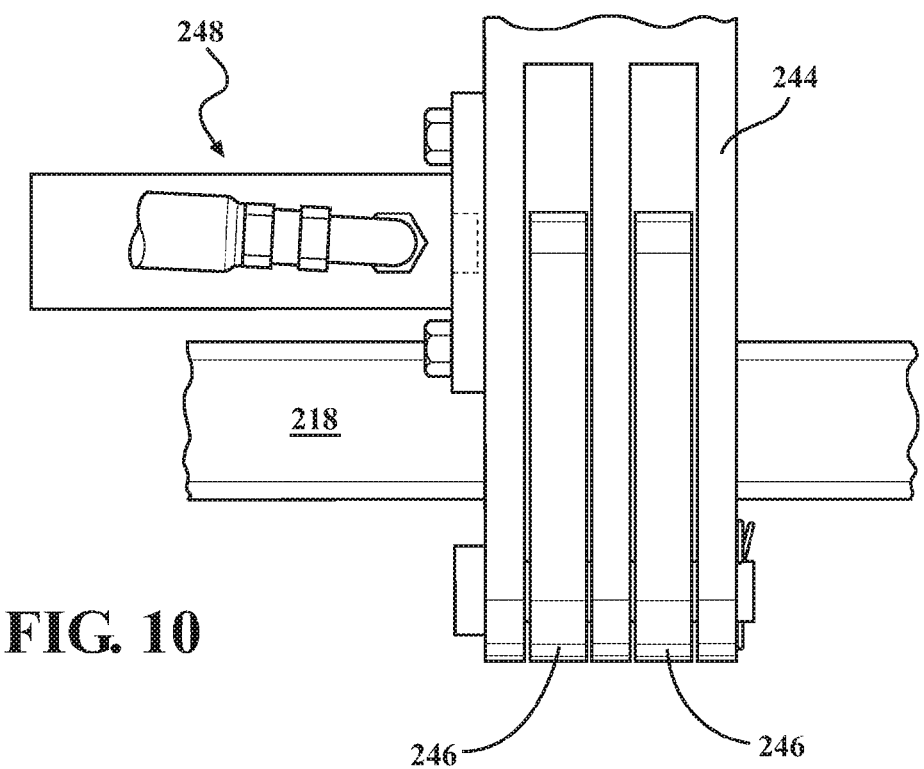
FIG. 10 is a detail view showing a locking mechanism of the height-adjusting axle assembly in an unlocked position.

In the illustrated example, the lock pin actuator 248 is a hydraulic actuator having a cylinder 250 and pin 252. The cylinder 250 is operable to move the pin 252 outward to a locked position, as shown in FIG. 9, and the cylinder 250 is operable to move the pin 252 inward to and unlocked position, as shown in FIG. 10. In the locked position, the pin 252 extends through aligned apertures in the interconnecting bar 244 and the second pair of flanges 246. In the unlocked position, the pin 252 is withdrawn from the apertures in the interconnecting bar 244 and the second pair of flanges 246. Thus, the lock pin actuator 248 causes extension of the pin 252 to define the locked position, and the lock pin actuator 248 causes retraction of the pin 252 to define the unlocked position. It should be understood that the lock pin actuator 248 would function identically if the pin 252 was positioned such that it extended through aligned apertures in the interconnecting bar 244 and the first pair of flanges 242 in the locked position.

Other types of actuators can be used as the lock pin actuator 248. For example, the lock pin actuator 248 could be any type of actuator such as electric, hydraulic or pneumatic.

Figure 7:
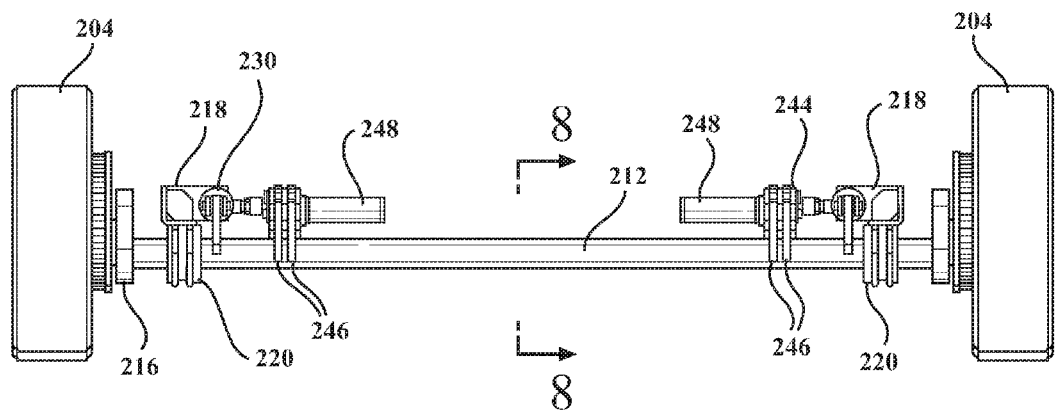
FIG. 7 is a rear view showing the height-adjusting axle assembly in the lowered position.
Figure 8:
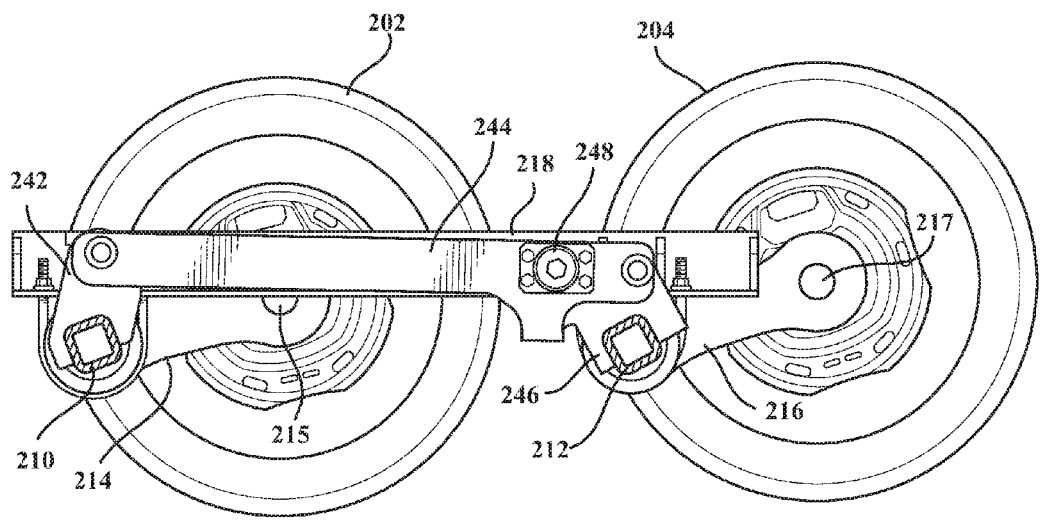
FIG. 8 is a cross-section view taken along line B-B of FIG. 5 showing the height-adjusting axle assembly in the lowered position.

Movement between the raised and lowered positions will be better understood with reference to FIGS. 5-8. The front wheels 202 and rear wheels 204 are connected to the torsion axles 214, 216 by front and rear stub axles 215, 217 respectively. Rotation of the front and rear cross-beams causes the stub axles 215, 217 to move in circular arcs centered on the front and rear cross-beams 210, 212. Since the heights of the front cross-beam 210 and the rear cross-beam 212 are fixed with respect to the frame rails 218 and the trailer frame 110, rotation of the cross-beam causes an elevation change of the stub axles 215, 217 with respect to the frame rails 218 and trailer frame 110. This allows movement from the raised position (FIGS. 5-6) to the lowered position (FIGS. 7-8).

While the disclosure has been made in connection with what is presently considered to be the most practical and preferred implementation, it should be understood that the disclosure is intended to cover various modifications and equivalent arrangements.

The invention claimed is:

1. A height adjusting mechanism for a trailer, comprising:
a first cross-beam;
a second cross-beam;
an interconnecting bar that is pivotally connected to the first cross-beam by first flanges and to the second cross-beam by second flanges;
an actuator to cause rotation of the first cross-beam and the second cross-beam between a first rotational position and a second rotational position;
a locking mechanism that is connected to and supported by the interconnecting bar and is operable to move between an unlocked position, wherein a pin of the locking mechanism is disengaged from a connection of the first flanges with respect to the interconnecting bar, and a locked position, wherein the pin is engaged in the connection of the first flanges with respect to the interconnecting bar and the first cross-beam and the second cross-beam are prevented from pivoting with respect to the interconnecting bar;
a first pair of wheels that are each connected to the first cross-beam by a first pair of torsion axles such that rotation of the first cross-beam causes rotation of the first pair of torsion axles; and
a second pair of wheels that are each connected to the second cross-beam by a second pair of torsion axles such that rotation of the second cross-beam causes rotation of the second pair of torsion axles.

2. The height adjusting mechanism of claim 1, wherein the first cross-beam and the second cross-beam each extend in a transverse direction and the interconnecting bar extends in a longitudinal direction.

3. The height adjusting mechanism of claim 1, further comprising:
a first frame portion and a second frame portion, wherein the first cross-beam and the second cross-beam extend between and are supported for rotation with respect to the first frame portion and the second frame portion.

4. The height adjusting mechanism of claim 1, the actuator includes a cylinder and a piston that is pivotally connected to one of the first cross-beam or the second cross-beam, and extension and retraction of the piston with respect to the cylinder causes rotation of the first cross-beam and the second cross-beam between a first rotational position and a second rotational position.

5. The height adjusting mechanism of claim 1, wherein the first cross-beam extends along a first beam axis, the second cross-beam extends along a second beam axis, the first pair of wheels are supported by the first pair of torsion axles such that the first pair of wheels are offset from the first beam axis, the second pair of wheels are supported by the second pair of torsion axles such that the second pair of wheels are offset from the second beam axis, rotation of the first cross-beam causes rotation of the first pair of torsion axles, and rotation of the second cross-beam causes rotation of the first pair of torsion axles.

6. A height adjusting mechanism for a trailer, comprising:
a first frame portion;
a second frame portion;
a first cross-beam that extends between the first frame portion and the second frame portion and is supported for rotation with respect to the first frame portion and the second frame portion wherein the first cross-beam extends in a transverse direction;
a second cross-beam that extends between the first frame portion and the second frame portion and is supported for rotation with respect to the first frame portion and the second frame portion wherein the second cross-beam extends in the transverse direction;
an interconnecting bar that is pivotally connected to the first cross-beam by first flanges and to the second cross-beam by second flanges, wherein the interconnecting bar extends in a longitudinal direction;
an actuator that is connected to the first frame portion and is connected to one of the first cross-beam or the second cross-beam to cause rotation of the first cross-beam and the second cross-beam between a first rotational position and a second rotational position;
a locking mechanism that is connected to and supported by the interconnecting bar and is operable to move between an unlocked position, wherein a pin of the locking mechanism is disengaged from a connection of the first flanges with respect to the interconnecting bar, and a locked position, wherein the pin is engaged in the connection of the first flanges with respect to the interconnecting bar and the first cross-beam and the second cross-beam are prevented from pivoting with respect to the interconnecting bar;
a first pair of wheels that are each connected to the first cross-beam by a first pair of torsion axles such that rotation of the first cross-beam causes rotation of the first pair of torsion axles; and
a second pair of wheels that are each connected to the second cross-beam by a second pair of torsion axles such that rotation of the second cross-beam causes rotation of the second pair of torsion axles.

7. The height adjusting mechanism of claim 6, wherein the actuator includes a cylinder and a piston that is pivotally connected to one of the first cross-beam or the second cross-beam, and extension and retraction of the piston with respect to the cylinder causes rotation of the first cross-beam and the second cross-beam between a first rotational position and a second rotational position.

8. The height adjusting mechanism of claim 6, wherein the first cross-beam extends along a first beam axis, the second cross-beam extends along a second beam axis, the first pair of wheels are supported by the first pair of torsion axles such that the first pair of wheels are offset from the first beam axis, the second pair of wheels are supported by the second pair of torsion axles such that the second pair of wheels are offset from the second beam axis, rotation of the first cross-beam causes rotation of the first pair of torsion axles, and rotation of the second cross-beam causes rotation of the first pair of torsion axles.

9. A trailer, comprising:
a trailer frame; and
a height adjusting mechanism that is connected to the trailer frame, having:
a first frame portion,
a second frame portion,
a first cross-beam that extends between the first frame portion and the second frame portion and is supported for rotation with respect to the first frame portion and the second frame portion wherein the first cross-beam extends in a transverse direction, a second cross-beam that extends between the first frame portion and the second frame portion and is supported for rotation with respect to the first frame portion and the second frame portion wherein the second cross-beam extends in the transverse direction, an interconnecting bar that is pivotally connected to the first cross-beam by first flanges and to the second cross-beam by second flanges, wherein the interconnecting bar extends in a longitudinal direction, an actuator that is connected to the first frame portion and is connected to one of the first cross-beam or the second cross-beam to cause rotation of the first cross-beam and the second cross-beam between a first rotational position and a second rotational position, a locking mechanism that is connected to and supported by the interconnecting bar and is operable to move between an unlocked position, wherein a pin of the locking mechanism is disengaged from a connection of the first flanges with respect to the interconnecting bar, and a locked position, wherein the pin is engaged in the connection of the first flanges with respect to the interconnecting bar, and the first cross-beam and the second cross-beam are prevented from pivoting with respect to the interconnecting bar, a first pair of wheels that are connected to the first cross-beam by a first pair of torsion axles such that rotation of the first cross-beam causes rotation of the first pair of torsion axles, and a second pair of wheels that are connected to the second cross-beam by a second pair of torsion axles such that rotation of the second cross-beam causes rotation of the second pair of torsion axles.

* * * * *